SELF SYNCHRONIZING SYSTEM

Filed June 2, 1960

Inventor
T. MATSUSHIMA
By C. H. Suydam
AGENT

United States Patent Office 3,088,071
Patented Apr. 30, 1963

3,088,071

SELF SYNCHRONIZING SYSTEM

Takao Matsushima, Tokyo, Japan, assignor to Nippon Electric Company Limited, Tokyo, Japan, a corporation of Japan Filed June 2, 1960, Ser. No. 33,441
Claims priority, application Japan June 6, 1959
2 Claims. (Cl. 325—50)

This invention relates to self-synchronizing systems in which the constant phase parts of a modulated carrier wave in an outgoing signal is transmitted by sending out signal markings or a series of intermittent sinusoidal oscillations whose frequency is inside or outside of the signal bandwidth, and, on the receiving side, selecting the signal markings without their being disturbed by the signal, generating a demodulating oscillation which, in itself, is independent of the modulated carrier wave at the transmitter but in synchronism with the said modulated carrier wave.

The effect of this invention is especially remarkable, for instance, in vestigial side-band transmission as described below in detail.

As is well known in vestigial side-band transmission, unless the phase of the demodulating oscillation is completely in synchronism with that of the carrier wave before modulation, the demodulated signal wave is distorted by the quadrature component, so it is necessary and indispensable to find out the phase information of the carrier wave before modulation on the receiver side, either by taking the long time average of the modulated carrier wave phase in the received signal, or by extracting the constant phase part of the modulated carrier wave from the received signal, in order to synchronize the phase of the oscillation with the carrier wave before modulation. Furthermore, it is well known that, since, in the vestigial side-band transmission system, it is common from its nature, to adopt the modulation factor of 100% or more, that is, the excess carrier ratio, for example, from 0.5 to 0.65 to make the outgoing power minimum, the existing methods are either restricted in realization, or their satisfactory performance cannot be expected.

According to the present invention, either the signal itself is utilized in the modulated signal, or the artificially inserted signal markings are superposed on the constant phase part of the carrier wave so as to result in modified signal markings. The modified signal markings are extracted at the receiving terminal, and, by the extracted modified signal markings, the constant phase part of the modulated carrier wave is selected easily and accurately independent of the signal content. Furthermore, since, in the use of such a signal markings, only its existence constitutes the main information content, its amplitude or phase is not important, and, on the other hand, since the selection of the modified signal markings depends on both the proper selection of the frequency domain by the filter and on the time domain by the time gate, the simultaneous transmission within the signal transmission band is possible without disturbing the signal either in frequency or in time.

To clarify the above features of this invention further, an example will be explained wherein the information signal to be transmitted is a television signal comprising 525-line 4.3-megacycle nominal band video signal.

Figure 1:
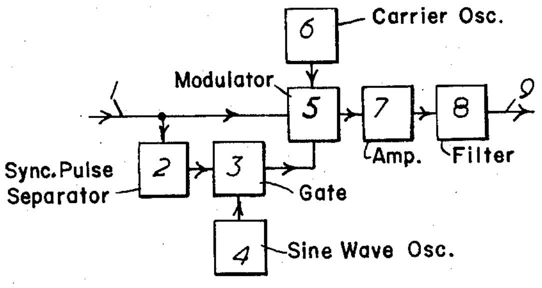
FIG. 1 shows the block diagram of the sending side of the device embodying the features of this invention, similarly
Figures 2, 3:
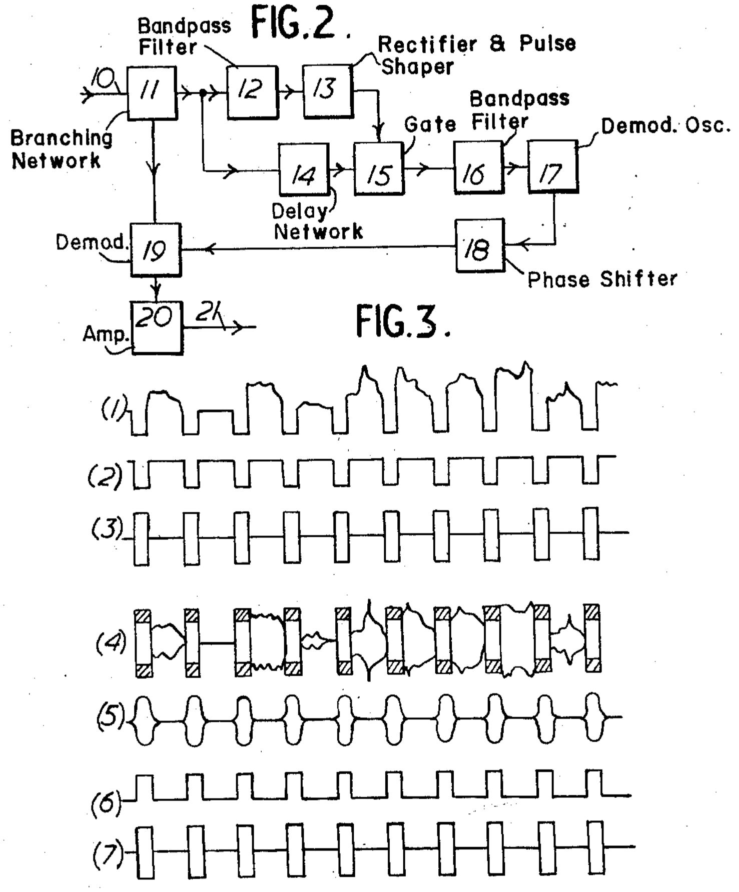
FIG. 2 shows the block diagram of the receiving side, and FIG. 3 exemplifies its operational state by referring to a concrete wave form.
FIG. 3 is merely for clarifying the drawings, and, it is to be noticed that, in general, it is not necessary to limit the incoming signal to such a wave form, and that the mutual relation of the wave forms is not shown so accurately.

In FIG. 1, the incoming signal (FIG. 3, (1)) which comprises video signal and synchronizing pulses are applied to the input of 1 of the sending device and is divided into two, from one of which the synchronizing pulses are separated at a conventional synchronizing pulse separator 2, to become a series of pulses, (FIG. 3 (2)). In the 525-line television signal, this series of pulses has a 15.75 kc./sec. repetition frequency and each pulse has about 5-microsecond pulse width. The said pulse series makes or breaks the sinusoidal oscillation generated by a sinusoidal wave oscillator 4 at the gate 3, producing the intermittent sine wave signal, (FIG. 3 (3)) which composes, as a whole, the above-mentioned signal markings. In this example, the frequency of the sinusoidal oscillation may be 4 mc./sec. The effective numbers of cycles contained in each of the signal markings are about 10 to 15 depending on the gate characteristics. On the other hand the other branch of the incoming signal is used to modulate the carrier wave oscillation generated by a carrier wave generator 6, in the modulator 5. The frequency of the carrier wave oscillation may be 6.799 mc./sec. as recommended by C.C.I.F. for the 12-megacycle coaxial cable carrier transmission system. However, at this time, the signal markings are also impressed on the modulator 5 simultaneously. In the modulator 5, the carrier wave oscillation of 6.799 mc./sec. is modulated by the video signal plus synchronizing pulses (FIG. 3 (1)) sent thereto from the input 1 and by the signal markings (FIG. 3 (3)) which are sent thereto from the gate 3. It is to be noted here that inasmuch as both the synchronizing pulse separator 2 and the gate 3 operate without any substantial time delay, the signal markings (FIG. 3 (3)) can be obtained at the output of the gate 3 as soon as the synchronizing pulse (FIG. 3 (2)) arrives at the input of the synchronizing pulse separator 2, or in other words in coincidence with the synchronizing pulses (FIG. 3 (2)). Therefore, the envelope of the modulated output of the modulator 5 becomes as shown in FIG. 3 (4) wherein the parts modulated by the signal markings, (which parts may be called modified signal markings and shown in FIG. 3 (4) by hatches) appear in superposition on the parts modulated by the synchronizing pulses. The phase of the carrier wave modulated by the synchronizing pulses does not vary relative to that of the carrier wave before modulation, irrespective of the content of the video signal, because of the constancy of the amplitude of the synchronizing pulses as shown in FIG. 3 (4). The phase of the carrier wave modulated by the video signal is shifted by 180 degrees with respect to that of the carrier wave before modulation. Although it is not shown in FIG. 3, there may be a case in which the amplitude of the video signal is so small that the phase of the modulated carrier wave is in phase with that of the carrier wave before modulation. At any rate, the phase of the carrier wave modulated by the synchronizing pulses is always in phase with that of the carrier wave before modulation. The modified signal markings are intermittent sine wave signals, the upper sideband component of which consists of about 25 to 40 cycles of sinusoidal oscillation having the frequency of about 10.8 mc./sec. The section *7* is the amplifier for the carrier wave band whose frequency range, in this example, is from about 6 mc./sec. to 12 mc./sec. and is sufficient to transmit the information to be sent to the receiving side, and section 8, the filter for shaping the vestigial side-band; this filter has a 6-decibel attenuation characteristic at the carrier frequency and also has point symmetric attenuation characteristics with respect to the carrier frequency. The vestigial side-band signal, after passing through these sections, is transmitted at a proper level.

In the receiving device of FIG. 2, the received modulated signal, received at input 10, divides into two branches at section 11, one going to the demodulator 19. Section 11 is a branching network, which may for example be a hybrid circuit. The other signal which is branched at section 11 is (after again branching into two) impressed on section 12 and section 14, separately. Section 12 is a bandpass filter, the center frequency of which is equal to the sum or difference of the frequency of the carrier wave oscillation and the sinusoidal oscillation depending on whether the vestigial sideband is upper or lower, respectively, and which has a bandwidth sufficient to transmit without any substantial distortion the modified signal markings. In the exemplified example, the center frequency of the bandpass filter 12 is about 10.8 mc./sec. and the main bandwidth (3-decibel down bandwidth) is about 300 kc./sec. Thus, at its output, the modified signal markings (FIG. 3 (5)) are obtained. The modified signal markings are then rectified and shaped into rectangular direct-current pulses (FIG. 3 (6)). The section 13 shows a rectifier and pulse shaper, which may comprise a rectifier and a monostable multivibrator triggered by the rectified modified signal markings. The direct-current pulse thus obtained, and the modulated signal, which is branched in the section 11 and passes through the delay network 14 (having the delay time equal to the group delay time for the bandpass filter 12), are impressed on the gate circuit 15 simultaneously. At the output of the gate 15 there is produced a signal (FIG. 3 (7)) which is gated by the rectangular direct-current pulse (FIG. 3 (6)) and composed of such portions in the modulated signal that are modulated by the synchronizing pulses plus the signal markings. The parts of such portions which are modulated by the synchronizing pulses are composed of an intermittent sinusoidal wave, the frequency of which (in the example so far described) is 6.799 mc./sec. and the phase of which has a constant difference determined by the delay time of the transmission path, from that of the carrier wave before modulation. By impressing this signal on the filter 16 with a very narrow bandwidth such as, for example, a crystal filter having about a 2 kc./sec. bandwidth, a continuous carrier wave is obtained, which wave can be used as a phase reference, for synchronizing a demodulating oscillator 17. The output of the demodulating oscillator 17 thus synchronized is passed through a phase shifter 18, needed for the compensation of the delay time in which the 6.799-megacycle sinusoidal wave applied to the input of the delay network 14 is obtained through the gate 15 and bandpass filter 16 at the output of the demodulating oscillator 17. The demodulating oscillation thus generated by the demodulating oscillator 17 and phase-shifted at the phase shifter 18 is applied to the demodulator 19. Thus, at the output of the demodulator 19, an identical television signal to the incoming signal in the transmitting side can be reproduced.

As is obvious from the above explanations, since the signal markings are discriminated in frequency by the filter and in time by the switching operation of the gate, no restriction is imposed on the selection of the signal marking frequency and the frequency most suitable to the nature of the signal may be selected. There are special cases, such as television transmission, where signal contents are exceedingly diverse and may produce an entirely false signal markings. This fact, however, does not deny the application of the system related to this invention. Just as a false signal markings can be discriminated in a television transmission system by utilizing the vertical synchronous signal in addition to the horizontal synchronizing pulses, so this system can be applied easily for such special cases by introducing some minor changes on the system construction.

The above explanation gives an example embodying this invention, but the application of the invention is not limited to such an example and it is obvious that the invention can be applied to any transmission system in which the self-synchronous system is used by utilizing, in general, the property of the signal itself for any input signal, or an artificial method. As can be seen from the example embodying the features of this invention, it is obvious that it is extremely effective for pulse series transmission such as television transmission and high speed data transmission.

What is claimed is:

1. A communication system for transmitting from a sending equipment a carrier wave modulated with an information signal having a predetermined frequency band to a receiving equipment, said sending equipment comprising an input, a carrier wave oscillator, synchronizing pulse separator means connected to said input for deriving from said information signal portions thereof spaced at predetermined time positions, means coupled to said separator means for generating signal markings in coincidence with said spaced portions each of said signal markings consisting of a plurality of sine wave cycles having a relatively narrow bandwidth, and means connected to the said input and the said carrier wave oscillator and the said signal markings generating means for modulating the carrier wave oscillations with the superposed input information signal and signal markings; said receiving equipment comprising filter means for deriving from the modulated carrier wave the portions that fall within said relatively narrow bandwidth, means connected to the said filter means for producing gate pulses spaced at said predetermined time positions, gating means connected to said gate pulse producing means and adapted to receive the said modulated carrier wave for deriving portions thereof corresponding to said time positions of said signal markings, and means independent of said transmitter carrier wave oscillator and coupled to said gating means for generating a continuous sinusoidal oscillation of a frequency equal to that of said carrier wave oscillator and a phase locked to the phase of the last-mentioned carrier wave portions.

2. A communication system as claimed in claim 1 in which the said signal markings generating means consists of a gate circuit and a sine wave oscillator connected to said gate circuit whereby the amplitude and phase of the sine wave cycles making up the signal markings remain unfixed.

References Cited in the file of this patent

UNITED STATES PATENTS

| | | |
|---|---|---|
| 2,843,658 | Christian | July 15, 1958 |
| 2,892,018 | Baugh | June 23, 1959 |